United States Patent
Tofts et al.

(10) Patent No.: US 7,623,022 B2
(45) Date of Patent: Nov. 24, 2009

(54) SECURING ELECTRONIC ANNOTATIONS

(75) Inventors: Christopher Tofts, Bristol (GB); James Thomas Edward McDonnell, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 828 days.

(21) Appl. No.: 11/237,912

(22) Filed: Sep. 29, 2005

(65) Prior Publication Data

US 2006/0071754 A1   Apr. 6, 2006

(30) Foreign Application Priority Data

Oct. 1, 2004   (GB) .................................. 0421821.0

(51) Int. Cl.
*H04L 9/32* (2006.01)

(52) U.S. Cl. ..................... 340/5.74; 340/5.1; 340/5.2; 340/5.21; 340/5.22; 340/5.25

(58) Field of Classification Search ................ 340/5.74, 340/5.1, 5.2, 10.2
See application file for complete search history.

(56) References Cited

U.S. PATENT DOCUMENTS

| | | | |
|---|---|---|---|
| 5,469,363 A | 11/1995 | Saliga | |
| 7,142,115 B2* | 11/2006 | Waters | 340/572.1 |
| 2004/0212480 A1* | 10/2004 | Carrender et al. | 340/10.42 |

FOREIGN PATENT DOCUMENTS

| | | |
|---|---|---|
| GB | 2395592 | 5/2004 |
| JP | 2000-187715 | 7/2000 |
| JP | 2002-007349 | 1/2002 |
| JP | 2002-123276 | 4/2002 |

* cited by examiner

*Primary Examiner*—Vernal U Brown (57) ABSTRACT

Methods are described for securing access to an electronic annotation provided on an object. The methods include the steps of providing the object with a plurality of memory tags, providing an electronic annotation on at least one of the memory tags, and defining a sequence in which the memory tags must be accessed in order to access the annotation. A corresponding object is also described.

39 Claims, 5 Drawing Sheets

SECURING ELECTRONIC ANNOTATIONS

FIELD OF THE INVENTION

This invention relates to the use of electronic data to annotate an item, in particular, although not exclusively, a document. More particularly, this invention relates to methods and apparatus for securing access to the electronic data.

BACKGROUND OF THE INVENTION

Memory tags in the form of Radio Frequency Identification (RFID) tags are well known in the prior art. RFID tags come in many forms but all comprise an integrated circuit on which, in use, data can be stored, and a coil that enables it to be interrogated by a reader that also powers it by means of an inductive (wireless) link. Generally RFID tags are quite large, due to the frequency they operate at (13.56 MHz) and the size of coil they thus require, and operate over large ranges and have very small storage capacities. Smaller RFID tags have also been developed, operating at various frequencies, but still having small storage capacities. Some RFID tags include Read Only Memory (ROM) and are written to at the time of manufacture, whilst others have read and write capability. RFID tags have tended to be used in quite simple applications, such as for file tracking within offices or in place of or in addition to bar codes for product identification and supply chain management.

One use to which such RFID tags can be put is the annotation of items, such as documents, with data over and above that printed on them. For example, in EP 1 076 316 A2, Eastman Kodak Company describe the use of an RFID tag of conventional form secured to a print, being an output image on a substrate, possibly of a photograph. The kind of data which it is envisaged will be stored in the RFID tag on the print relates to the manner in which the print has been processed, particularly if the print is an output sheet from a proofing system. In any event the examples of data given range from 8 bits to 256 bits. A technique is described for communicating with multiple prints within range of the transceiver used to communicate with them, such as for example if a single print needs to be located amongst a file of such prints.

GB 2395592, discloses the annotation of objects, such as documents, with electronic data. In this document, one or more memory tags are arranged in or on the object which is to be annotated.

A significant disadvantage with such annotation is that the data stored in a memory tag is accessible by a reader, which powers up the tag and causes its stored information to be output. This is particularly undesirable when the data that is stored is of a sensitive or confidential nature. An example of such data are the medical details of a patient annotated to that patient's medical card. It is problematic that any person with access to a reader may access this information by bringing that reader into close proximity with the memory tag whether or not they are authorised to do so. Hence, it is desirable to secure access to memory tags that are used to annotate items.

Currently, security may be provided by the provision of security measures in the two way exchange between a memory tag and reader. For example, the reader may require the entry of a password or code to activate it prior to its use. However, to ensure a reasonable level of security, a password or code must be of a sufficient length or complexity to prevent it being easily determined by trial and error. This presents a problem to the user of the reader in that memorising the given password or code may be difficult. People are required to memorise many passwords and codes for security purposes including, for example, computer network passwords and bank and/or credit card personal identification numbers. The longer a password or code is and/or the more passwords or codes that must be renumbered, the greater the likelihood is that a user will be unable to recall the necessary password or code. This often leads to users writing down codes as an aide memoir. Such aides memoir may be observed/obtained by third parties, and may therefore be a major source of security violation.

SUMMARY OF THE INVENTION

This invention provides a method of securing access to an electronic annotation provided on an object, comprising the steps of providing the object with a plurality of memory tags, providing on at least one of the memory tags an electronic annotation, and defining a sequence in which the memory tags must be accessed in order to access the annotation.

BRIEF DESCRIPTION OF THE DRAWINGS

Specific embodiments of the present invention are now described, by way of example only, with reference to the accompanying drawings in which:

FIG. 2b is a representation of a coding sequence assigned to the memory tags of FIG. 2a;

DETAILED DESCRIPTION

Figure 1:
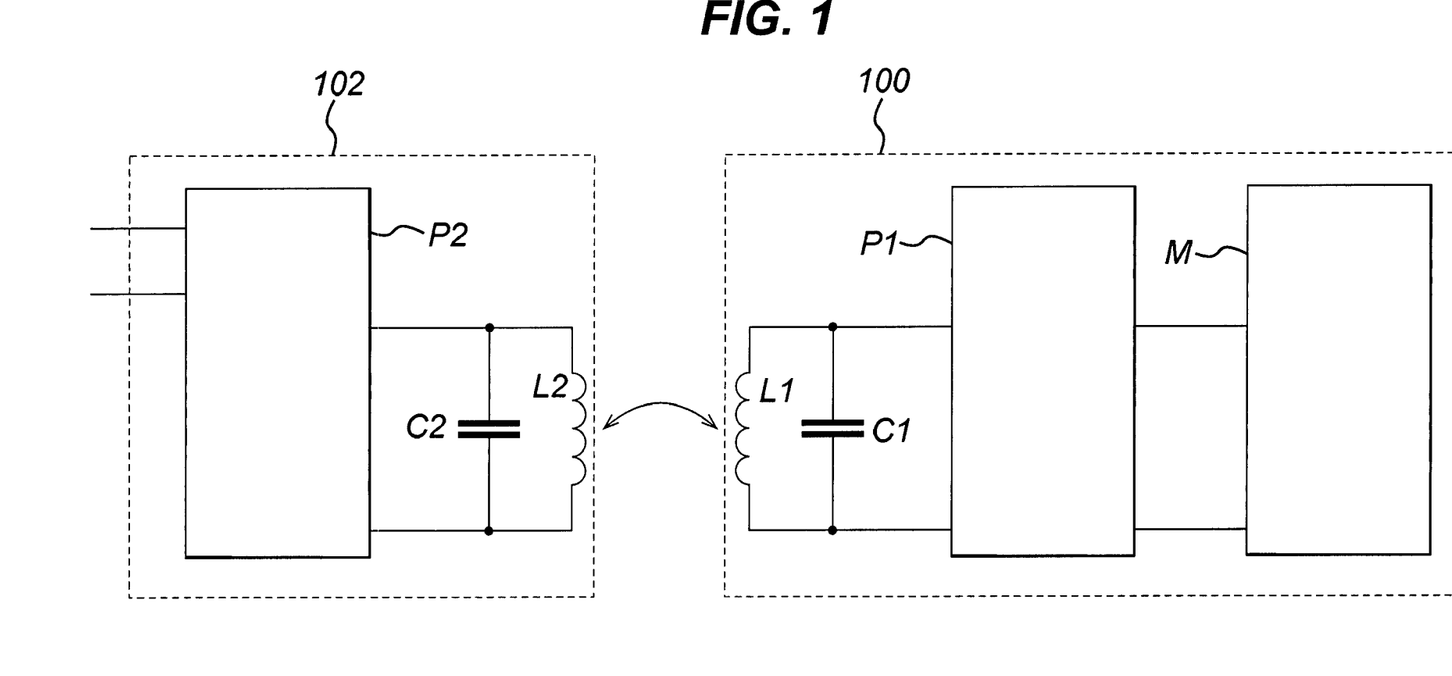
FIG. 1 is a schematic of a memory tag which may be utilised in the present invention.

Referring firstly to FIG. 1, the basic operation of a memory tag 100 and reader 102 which may be employed in this invention will be described. The memory tag 100 includes an antenna coil L1 and a capacitor C1 connected in parallel therewith to form a resonant circuit. It further includes a memory M and processing and power circuit P1. The reader 102 includes an antenna coil L2 and a capacitor C2 in parallel therewith to form a resonant circuit, and a processing and signal generating circuit P2.

A signal generator within P2 generates a signal at a chosen frequency of operation of the tag 100, such as 2.45 GHz, which is applied to the antenna coil L2 and thus generates an electromagnetic field which, provided the memory tag 100 is sufficiently close to the reader 102, penetrates the antenna coil L1 of the memory tag 100. By induction, a voltage is thus generated in the antenna coil L1, which is rectified in circuit P1 and is used to power the memory tag 100. The capacitances of the capacitors C1 and C2 are selected such that the resonant circuits are both resonant at the frequency generated by the signal generator, in order to maximise transmitted signal strength and received signal.

When data stored in the memory tag 100 is to be read by the reader 102, the reader 102 is brought into close proximity with the tag 100 thus causing it to power up as discussed above. The circuit P1 applies a signal indicative of the data stored in the memory to the antenna coil L1 which is detected, as a result of the inductive coupling, by antenna coil L2 and which is deciphered in circuit P2 before being passed from the reader 102 to a main processor of the reading apparatus. This signal may, for example, be transmitted using load modulation. In RFID systems such as this, the power consumed by the memory tag 100 can be measured as a drop in voltage across the internal resistance of the antenna coil L2 of the reader 102. A load resistance within the circuit P1 may be switched on and off, thus altering the power consumed by the memory tag 100, which is then detected as an amplitude modulation of the voltage across the antenna coil L2 of reader 102.

A key feature of the memory tags preferably employed in this invention is their size. Each memory tag is preferably approximately 2 mm$^2$ in size and has a capacity of approximately 1 Mbit or more. Input and output to the memory device is via close range coupling. In this sense, close range means approximately 3 to 4 mm or less, or more preferably 1.5 mm.

Of course, memory tags having other dimensions, capacities and ranges may equally be used in the present invention, as may tags that operate outside the RF frequency band. However, as will become apparent, it is necessary for such memory tags to operate via close range coupling, wherein close range is relative to the size of an object to be annotated using the tags. The range at which coupling occurs must be such that a plurality of tags may be located on the object being annotated in an arrangement which precludes their coupling regions overlapping.

Memory tags may be deposited onto an object having the annotation data to be applied to that object already stored upon them. Alternatively, they may be applied to the object and then have annotation data written into them. Further, memory tags may be deposited onto an object or incorporated into it. For example, a printing device, such as an inkjet printer may have incorporated into it a module for depositing on print media memory tags. The module may be positioned to scan across the print media such that memory tags may be deposited anywhere upon the media. Of course, other types of printing devices may also be used. The accuracy of printing devices in ink or colourant deposition may thus be transferred to memory tag deposition also, ensuring that their location on the print media is accurately defined. Such print devices may also include readers and may write to the memory tags.

Data may also be written to the memory tag 100 of FIG. 1 using the reader 102, which may also therefore be a write device. When data is to be written to the memory tag 100 by the write device 102 the radio frequency signal generated in P2 is modulated, e.g. amplitude modulated, with the data to be written before it is applied to the antenna coil L2 and transmitted. The signal received by the memory tag 100, by inductive coupling, thus both powers the memory tag 100 and communicates with it. The circuit P1 separates the data signal from the carrier signal and passes data for storage to the memory M.

As has already been mentioned, there are situations in which the electronic data used to annotate an object, such as a document, is of a sensitive or confidential nature, and it is necessary to attempt to secure access to it. In accordance with this invention, in order to add a level of security to an object that is annotated with electronic data, a number of memory tags are introduced to that object in a chosen pattern. The pattern may be uniform, or otherwise. It may be specified by a user of the object. Above all, it is a pattern which is recognisable to, and preferably memorable for, a person or persons to whom access to the electronic data is permitted. The tags may be deposited on the object or incorporated into it as described above.

Figure 2A:
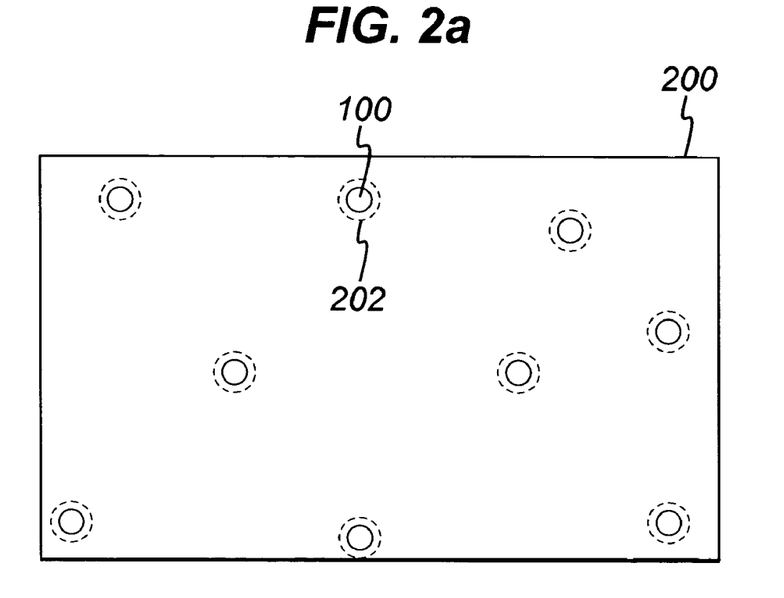
FIG. 2a is a representation of a sheet of print media on which are arranged in a defined pattern a plurality of memory tags according to the invention.

FIG. 2a shows a sheet of print media 200 onto which a number of memory tags 100 have been deposited in a defined pattern. The print media may be any appropriate form of media including paper, card stock, film, etc. The dotted circles 202 indicate the required proximity of a reader 102 to power up each memory tag. This precise positioning and the ability of a reader to read the tags only when in close proximity may be exploited to encode access to the data stored in the tag(s).

Figure 2B:
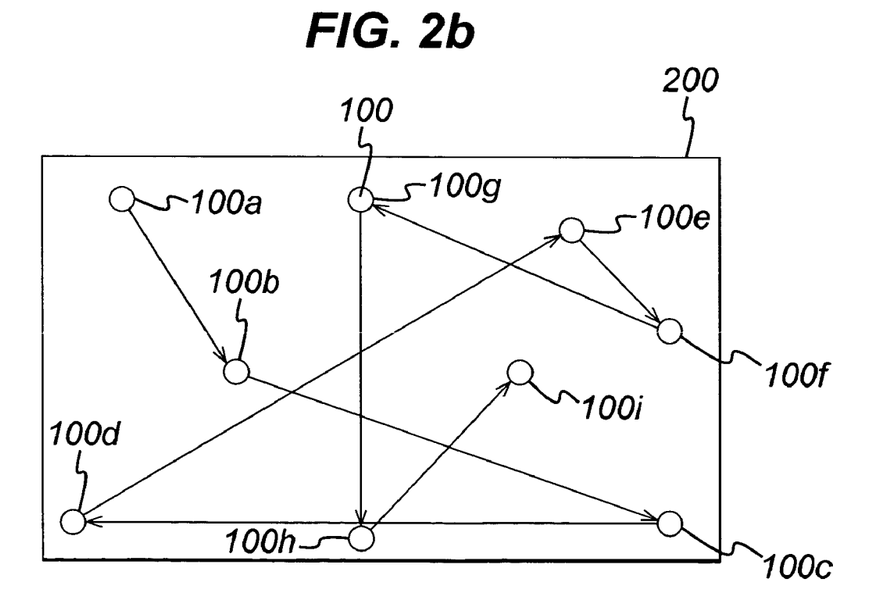

Each memory tag in the pattern is assigned a position in a sequence. The sequence is defined to be memorable to a user. Access to the electronic data, which may be stored on one or more of the tags is obtained by passing a reader 102 over the memory tags in the correct sequence. An example sequence is depicted in FIG. 2b. The sequence commences with a reader 102 communicating with memory tag 100a in the top left corner of the depicted sheet of media. The reader then communicates with each of the other tags 100b to 100i shown, in the order demonstrated by the joining arrows.

Figure 3:
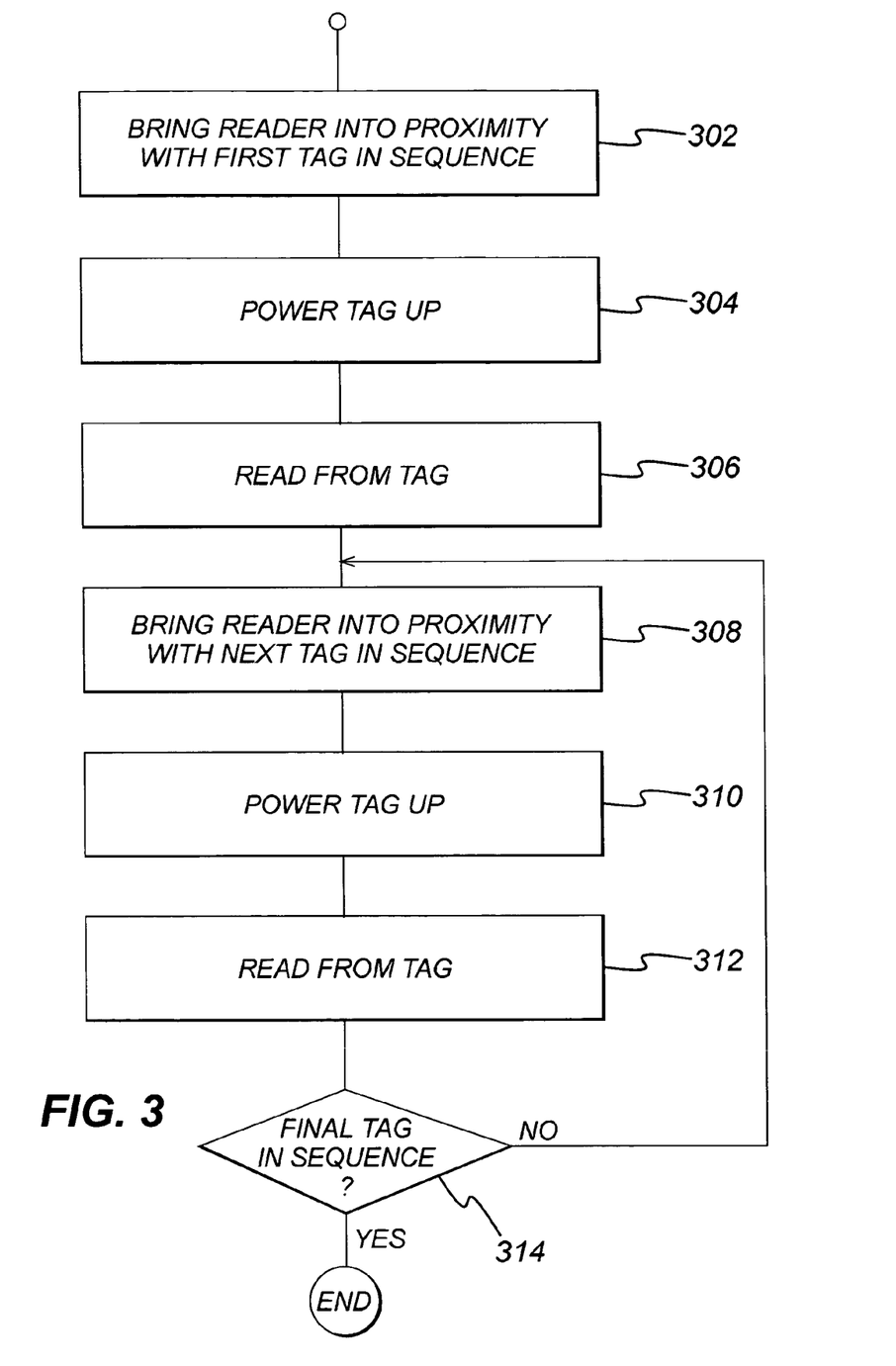
FIG. 3 is a flow diagram showing the steps taken to access electronic data annotating an object.

FIG. 3 shows the steps that are taken in order to access the electronic data stored in the memory tags 100 on an object, such as the document 200 of FIGS. 2a and 2b for example. The data may be fragmented and stored in a plurality of the tags 100, or it may all be stored in one tag 100 only, such as the final tag 100 in the sequence.

Each tag 100 in the sequence includes a challenge and response field and the processor P1 in the tag 100 is configured to compare a received challenge, i.e. a proffered access code, with that which it is expecting, i.e. the code stored in the challenge field, and to respond accordingly, as will now be explained.

In step 302 a reader 102 is brought into proximity with the first memory tag 100 in the sequence. This is effected by a user of the reader/annotated object who knows the pattern and correct sequence to access the annotation. When the reader is close enough to the first tag, it causes it to power up (step 302) in the way already described. Hence, the user must position the reader 102 accurately. In a first embodiment, the first tag is configured to provide a valid response upon being read (step 304). In this case there is either no challenge field or that field is empty. However, the first memory tag has stored in its response field a valid access code for the second tag 100 in the sequence. This code is read by the reader 102. In an alternative embodiment, in order to read the first tag 100 the reader sends to it an access code, e.g. 1234. The first tag 100 is configured to provide a valid response no matter what code it receives.

This is an additional security feature. If a valid code is not provided in response to the access request, a person seeking unauthorised access could ping the tag 100 numerous times, each with a different code, in a very short space of time. A response would be expected within a fraction of a second (such as 1/1000s). Hence, if no response were received, another combination could be tried very quickly. By providing a valid response as the output of the first tag in the sequence this is prevented. Alternatively, a reset button may be provided on the reader, which must be pressed after each attempted access code which has not yielded a response from the tag in order that a further attempt may be made.

Once the first tag 100 has output the code in response to the readers proximity, the reader 102 is moved into proximity with the next tag in the sequence (step 308). Again, the user knows the pattern of tags on the object and the sequence in which they must be passed over by the reader 102 in order to gain access to the information stored. Referring briefly to FIG. 2b, the reader is moved from tag 100a to tag 100b. The reader causes the second tag 100b to power up (step 310) and thus reads the tag (step 312).

In order to read the second tag 100b, the reader provides to it the access code read from the first tag 100a. The processor P1 in the second tag compares this code with the code that it expects to receive, which is stored in its challenge field. If this code matches, then the response in the response field is provided to the reader 102. This response will be the access code for the next tag, 100c for example, in the sequence. However, if the received code does not match that in the challenge field, the processor will cause the memory tag 100b to provide an erroneous code, such as a random code, to the reader. An incorrect code will be received if the tag 100 visited immediately before is not that one defined in the sequence.

In the first embodiment, when the first tag 100a is merely powered up and provides the code, an incorrect code will not be provided to the second tag 100b. However, if an incorrect tag, such as 100g, is visited after the first tag 100a, the access code provided to it (which will be provided to the reader 102 by the first tag 100a in the sequence) will be an incorrect one, thus causing an erroneous code to be output by tag 100g, i.e. a code that will not allow access to tag 100h, the next tag 100 in the sequence. Preferably, the code output by, for example, tag 100g in this scenario, will not allow access to any of the tags 100 in the sequence.

In the second embodiment, if the user inputs an incorrect access code which is then sent to the first tag 100a in the sequence by the reader 102, the first tag will provide a valid access code for the second tag in the sequence for the reasons already given.

Once the second tag in the sequence has been read, it is determined whether the sequence has been completed (step 314). If it has not, steps 308 to 314 are repeated for each additional tag 100 in the sequence. If it is determined that the sequence is complete one of three things may occur.

In one embodiment, in which all annotation data is stored in the last tag in the sequence, when the reader 102 is brought into proximity with the last tag, powers it up and provides the correct access code, the processor in the last tag outputs the annotation data from the memory M to the reader, and the process ends.

In another embodiment, the annotation data is fragmented and stored in multiple memory tags 100. As the reader 102 accesses each tag 100 in which information is stored, i.e. when it provides the correct access code, the stored data is output to the reader along with any access code for the next tag in the sequence. Hence, when the last tag has been read, the process ends. Obviously, as the first tag 100a in the sequence always provides a valid output, it is preferable not to store annotation data on this tag 100, as it will be accessible whenever a reader is passed over it. However, in certain situations this may be desirable.

In yet another embodiment, again in which the annotation data is fragmented and stored in multiple tags 100, the final tag 100 in the sequence, when provided with the correct access code, will provide to the reader a master access code. This will allow access to all memory tags on the object for a short period of time, such 5 seconds. The reader 102 may then be passed over all the tags, such as those shown in FIG. 2a, and thus will power them up, provide the master code which is recognised as such by the processor in each tag 100. The processor P1 will then output the stored data. This embodiment is particularly useful in scenarios where activation of the reader 102 is not protected and/or when readers 102 are readily available.

To enable this embodiment to function, each tag 100 will also include a master code field containing a valid code to which a received master code will be compared. If the value in that field matches the master code received, the data will be output. Further, the length of time during which the master access code will be valid, from the time at which it is provided to the reader, may be controlled in two ways. Firstly, a time out function can be provided in the reader, so that the received code will remain valid for a prescribed time only. This can be achieved by automatically inhibiting or deleting the master access code in the reader once a number of reader/system clock cycles have passed. Secondly, each memory tag to which the master code applies can be configured such that receipt of a master code will only be effective within a finite time period after that memory tag has been accessed by the reader during the access sequence. If the master code is provided within that time period, access will be allowed. However, if the master code is provided outside that time period, access will be denied. For example, an incorrect, e.g. random, code will be provided in response to receipt of the master access code.

From the above description it is clear that by following the sequence assigned to the tags 100 on the object 200 the correct codes will be provided to the reader to enable access to the next tag in the sequence, and eventually to the information stored in the tags 100, as described above. However, if the sequence is not followed correctly, for example in FIG. 2a, tag 100g is passed over after tag 100a, the code provided by tag 100 will be incorrect for tag 100g, which will therefore output a code that will not access the next tag in the sequence. This will promulgate through the sequence, i.e. one mistake will prevent access to some or all data. Hence, if the sequence is not known, or is not followed, access to the stored information is either limited or prevented completely.

As will be appreciated, the above pattern/sequence encoding provides access security to an object that has electronic annotations by exploiting a user's positional awareness. A user must memorise a pattern of physical movement in order to access the annotation, which for some people is very easy.

It has been discussed above that the pattern/sequence encoding of this invention may be used alongside further security measures, such as the provision of an access code to the reader 102 in order to access and read the first tag 100a in the sequence. In this scenario, the provision of memory tag pattern/sequence encoding using n tags will provide a further coding range of n!. Hence, the combination of these two coding mechanisms will increase the security of the annotated data significantly. Alternatively, it will allow for a reduced length access code, for example, whilst maintaining a desired level of security. The coding range sacrificed by shortening or simplifying an access code can be compensated for using the scheme described above.

Figure 4A:
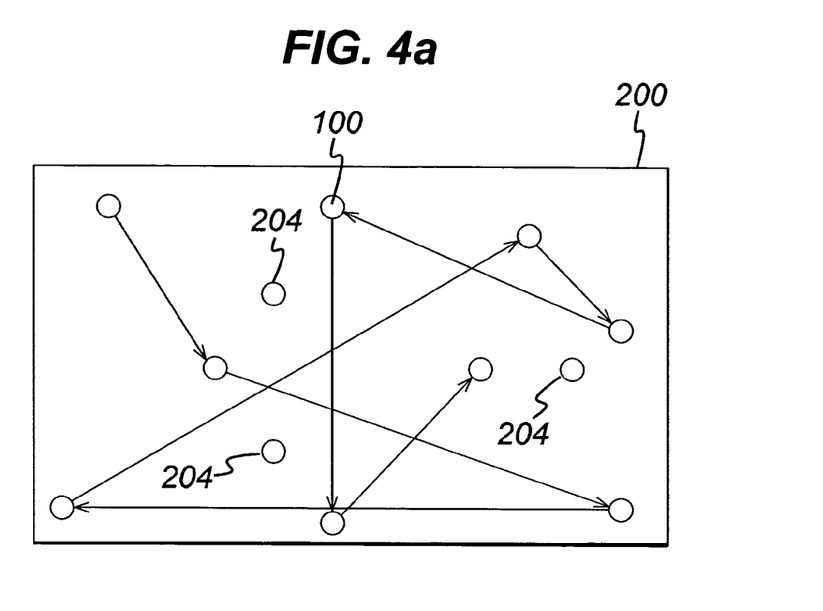
FIG. 4a is a representation, as shown in FIG. 2b, in which rogue memory tags are also present.

The level of security achievable by the present invention may be increased as will now be described with reference to FIGS. 4a and 4b. FIG. 4a shows a document 200 as shown in FIGS. 2a and 2b, but to which a number of additional memory tags 204 have been introduced. These memory tags 204 operate as described above, but do not form a part of the access coding sequence. They are rogue tags. If, during an access sequence, the reader passes close enough to one of these rogue tags, it will be powered up as described above, and will return to the reader a spurious code, e.g. a random code. Receipt of this code will interrupt the access sequence because it is not a part of that sequence. Its provision to a following tag 100 in the sequence will not allow access to that tag 100. The sequence will thus be broken and access will be denied. Such rogue tags 204 may be placed anywhere on the object that is being annotated, in the ways described. However, as with all of the tags discussed, it is important that the zones of proximity (202 in FIG. 2a) in which the reader 102 will power up and interact with the tags do not overlap.

Figure 4B:
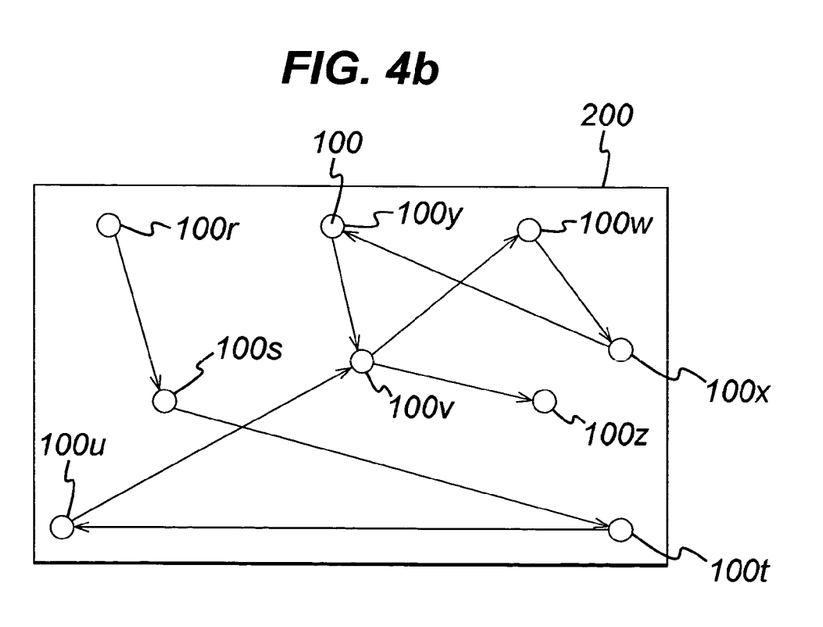
FIG. 4b is a representation of a coding sequence assigned to a number of memory tags in which repeat visits are supported.

FIG. 4b shows a different sequence in which a reader 102 is brought into proximity with the memory tags 100 that are present on the document 200. The sequence starts with tag 100r in the top left corner of the document and passes tags 100s, 100t, 100u, 100v, 100w, 100x, 100y, 100v again and 100z as shown by the joining arrows. Allowing repeat visits to memory tags 100 during an access sequence increases the coding level by (rn)!, where n is the number of memory tags 100 in the coding sequence and r is the number of repeat visits that are made.

In order to allow repeat visits to a memory tag 100 it is necessary to update the tag protocol to include a notion of state. As each tag includes a processor P1 and a memory M it is effectively a miniature computer. It may therefore be written to and read from. A notion of state may be added to the protocol as follows. When the reader visits a memory tag 100, as well as providing to that tag 100 an access code, it will send a reader system processor clock signal also. This clock signal will be stored in the tag 100 and thus the tag will know at what time it was accessed. By programming each tag 100 to know what the entire access sequence is and thus where it lies within the sequence, its knowledge of when it has been visited may be used by the processor P1 to determine the appropriate code to output. For example, in the sequence of FIG. 4b, tag 100v is visited twice. It knows that it is visited twice because the entire sequence is known to it. Hence, when a reader visits tag 100v, if it has not been visited recently it knows that the next tag in the sequence is tag w and stores the time "a" at which it was visited. When it is next visited, it knows that it was visited at time "a" and thus that the next tag in the sequence is tag 100z. The appropriate output may therefore be provided. This assumes that the sequence depicted has been followed correctly and thus that the correct access codes are provided to tag 100v on both occasions. If this is not the case, erroneous codes will be output. Of course, if the tag 100v is visited again, or the time between the two accesses exceeds a predetermined threshold, erroneous codes will be output.

The present invention is of particular use in the transfer of high value information between physical sites, or where public key encryption is banned by legislation. Continuing with the example of electronically annotated documents, the following are illustrative. Current patient information such as name, address, age, etc in paper format to which is annotated electronically that patient's medical history. Client details in paper form to which is annotated electronically client account information. A company project overview in paper form to which is annotated electronically company strategy relating to that project. All such information is of a sensitive nature and needs to be secured against access by unauthorised/undesired people. Of course, numerous other examples exist.

Figure 5:
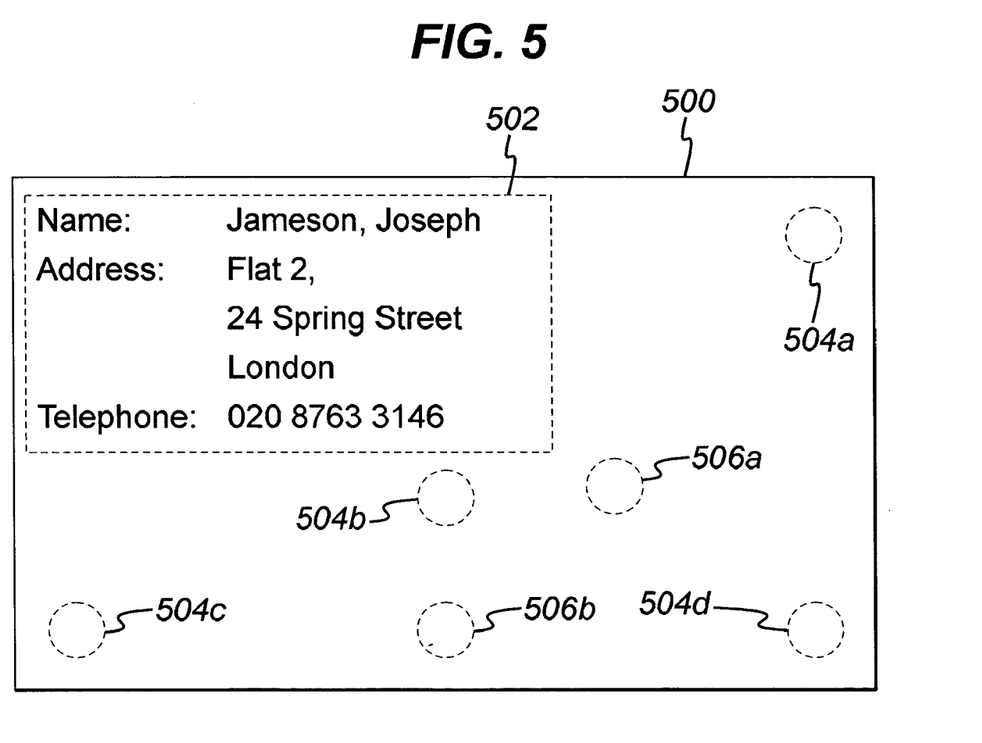
FIG. 5 is a representation of a medical record card annotated and secured according to an embodiment of the invention.

Following is a brief example of the present invention. A patient details card, as shown in FIG. 5, is printed using a printing device in which is also provided a memory tag deposition apparatus and a tag read and write module. As may be seen, the card 500 includes textual details 502 of the patient and a number of memory tags 504, shown as hidden detail. A number of rogue tags 506 are also present. The full medical history of the patient named on the card is stored on the memory tag 504d, written to it by the write device in the printer that prints the card. Each of the tags 504a-504d have a challenge and response field containing appropriate values (no value if appropriate) stored in their memory as shown in table 1.

TABLE 1

| Tag number | Challenge | Response |
| --- | --- | --- |
| 504a | 1234 | 2345 |
| 504b | 2345 | 3456 |
| 504c | 3456 | 4567 |
| 504d | 4567 | |

Moreover, each of the rogue memory tags 506a, b has a random response field that is output whenever a reader is brought close enough to it to power it up, examples of which are shown in Table 2.

TABLE 2

| Tag number | Random Response |
| --- | --- |
| 506a | 5251 |
| 506b | 3352 |

All of this information is written to the tags as described previously. The challenge field in each tag sets forth the correct access code for that tag. Only if this code is received from the reader will the correct access code for the next tag in the sequence (stored in the response field) be output. The sequence in which the reader must interact with the tags to gain access to the medical records is dictated by these codes, and in this example is 504a, 504b, 504c and 504d, as will be appreciated.

In order to access the medical information stored on tag 504d the user brings a reader into close proximity with the first tag 504a which is thus powered up. The user enters the code "1234" into the reader, which is passed on to the first tag 504a. The first tag compares this challenge with the data in its challenge field. If it matches, the code "2345" is output to the reader. If not, an erroneous or random code is output. In this example, the code matches, so the user then moves the reader proximate to tag 504b where the code "2345" is provided to it by the reader 102 and the tag outputs "3456". This procedure is repeated at tag 504c (input 3456, output 4567) and when the reader is moved proximate to tag 504d the code 4567 is input and the patient's medical history is output. Only if this sequence is followed will the correct access codes be provided to all tags in the sequence and thus access to the patient's medical history data on the final tag be granted. The user must therefore know the sequence and position of the tags on the record card to enable access, in addition to the access code for the first tag in the sequence.

Similarly, the user must avoid the rogue tags. If the reader is brought proximate to, for example, tag 506b, whilst moving between tags 504c and d, the reader will receive the code "3352" which will be supplied to tag 504d. Tag 504d will then output a random number rather than the patient's medical history.

As will be appreciated, using the present invention, confidential electronic data annotated to a physical object may be secured such that it is not accessible to unauthorised personnel. This enables it to be moved between locations with peace of mind and also allows for the objects to be housed in less secure conditions, both of which are obvious advantages.

It will of course be understood that the present invention has been described above by way of example only, and that modifications of detail can be made within the scope of the invention. In particular, print medium includes any form of media to which printing may be carried out, such as paper, card stock, acetate sheets, etc. Moreover, although RFID memory tags have been discussed, any form of memory tag or equivalent device which may be positioned accurately in a pattern on an object, and which may be read from in that location, but only by a reader in close proximity, may be utilised.

The invention claimed is:

1. A method of securing access to an electronic annotation provided on an object, comprising the steps of:
    providing the object with a plurality of memory tags;
    providing on at least one of the memory tags an electronic annotation; and
    defining a sequence such that the memory tags are ordered into the sequence such that access to the electronic annotation can only be achieved by accessing the memory tags in the sequence in the prescribed order.

2. A method as claimed in claim 1 wherein the plurality of memory tags are provided on the object in a predetermined pattern.

3. A method as claimed in claim 1, wherein defining the sequence includes the step of defining an access code for the second and each subsequent memory tag in the sequence.

4. A method as claimed in claim 3, also including defining an access code for the first memory tag in the sequence.

5. A method as claimed in claim 3, wherein the access code for each nth memory tag in the sequence is provided in the n−1th memory tag.

6. A method as claimed in claim 5, wherein the step of defining a sequence includes configuring the second and each subsequent memory tag in the sequence up to memory tag n−1 to receive a code, compare that code with the defined access code and, if they match, to output the access code for the memory tag next in the sequence, where n is the total number of memory tags in the sequence.

7. A method as claimed in claim 6, wherein the step of defining a sequence includes configuring the second and each subsequent memory tag to output an incorrect access code if the received code and defined access code do not match.

8. A method as claimed in claim 3, wherein the first memory tag in the sequence is configured to output the access code defined for the second memory tag in the sequence upon being validly accessed.

9. A method as claimed in claim 2, including the step of providing the object with one or more memory tags which are not a part of the defined sequence.

10. A method as claimed in claim 9, wherein the one or more memory tags that are not a part of the defined sequence are each provided with a code which is output when the tag is accessed.

11. A method as claimed in claim 1, wherein the annotation is provided on a final memory tag in the sequence.

12. A method as claimed in claim 1, wherein the annotation is provided on two or more memory tags within the sequence.

13. A method as claimed in claim 11, including the step of configuring a memory tag upon which the annotation is stored to output that annotation upon receipt of a valid access code.

14. A method as claimed in claim 12, including the step of providing the final memory tag in the sequence with a master access code which allows access to all memory tags in the sequence, and configuring it to output that master access code upon receipt of a valid access code.

15. A method as claimed in claim 14, including the further step of configuring each memory tag in which the electronic annotation is stored, upon receipt of the master access code, to output the electronic annotation.

16. A method as claimed in claim 3, wherein the step of defining a sequence includes defining repeat visits to at least one of the provided memory tags, and providing at that memory tag the access code for each next memory tag in the sequence.

17. A method as claimed in claim 16, including the step of configuring the at least one memory tag to determine the correct access code for output in accordance with the sequence and a number of accesses of that tag.

18. An electronically annotated object having annotation access security comprising:
    a plurality of memory tags arranged on or in the object, at least one of the memory tags having stored therein an electronic annotation; and
    wherein the memory tags are ordered into a sequence such that access to the electronic annotation can only be achieved by accessing the memory tags in the sequence in the prescribed order.

19. An object as claimed in claim 18, wherein the plurality of memory tags are arranged in a predetermined pattern on the object.

20. An object as claimed in claim 18, also including one or more memory tags which are not a part of the sequence arranged on or in the object.

21. An object as claimed in claim 20, wherein each memory tag that is not part of the sequence has stored thereon a code which is output when that memory tag is accessed.

22. An object as claimed in claim 18, wherein the annotation is stored in a last memory tag in the sequence.

23. An object as claimed in claim 18, wherein the annotation is stored in two or more memory tags within the sequence.

24. An object as claimed in claim 22, wherein a processor of a memory tag upon which the annotation is stored is configured to output the annotation upon receipt of a valid access code.

25. An object as claimed in claim 18, wherein the object is a document.

26. An object as claimed in claim 18, wherein each memory tag is approximately 2 mm$^2$.

27. An object as claimed in claim 18, wherein each memory tag has a memory capacity of at least approximately 1 Mbit.

28. An object as claimed in claim 18, wherein each memory tag has a range at which it is accessible by a reader device.

29. An object as claimed in claim 28, wherein the range is approximately 3 to 4 mm.

30. An object as claimed in claim 28, wherein the range is approximately 1.5 mm.

31. A method of accessing a secured electronic annotation applied to an object, comprising the steps of:
    a) with a memory tag reader, reading from a first memory tag in a defined sequence of memory tags on the object an access code for a next memory tag in the sequence;
    b) applying the access code to the next memory tag in the sequence;
    c) reading from that memory tag an access code for a next memory tag in the sequence;
    d) repeating steps b) and c) for all memory tags in the sequence up to n−1, where n is the total number of tags in the sequence;
    e) applying the access code to the nth tag in the sequence; and
    f) reading the annotation from at least one of the memory tags within the sequence.

32. A method as claimed in claim 31, wherein applying an access code comprises, positioning the reader proximate a memory tag, powering up the memory tag with the reader, and providing to the memory tag the access code.

33. A method as claimed in claim 31, wherein if a memory tag not in the sequence is read or a memory tag is read out of sequence in steps a), c) or d), reading from the memory tag an access code that will not access a memory tag in the sequence.

34. A method as claimed in claim 31, comprising the further step of, in a memory tag to which an access code is applied, comparing the applied access code to a valid code stored in the memory tag and, if they match, enabling reading from the memory tag.

35. A method as claimed in claim 31, comprising the further step of, in a memory tag to which an access code is applied, comparing the applied access code to a valid code stored in the memory tag and, if they do not match, providing an incorrect access code as output and inhibiting step f) for that tag.

36. A method as claimed in claim 31, wherein the annotation is stored on the last memory tag in the sequence, and step f) is carried out after step e).

37. A method as claimed in claim 31, wherein the annotation is stored on two or more memory tags in the sequence, and step f) is carried out alongside the step of reading the access code from each non-final memory tag.

38. A method as claimed in claim 31, wherein step f) includes the following steps:
   i) reading from the nth tag in the sequence of memory tags a master code that allows access to all memory tags in the sequence;
   ii) moving the reader into proximity with each memory tag that contains annotation data;
   iii) providing the master code to each tag mentioned in step ii); and
   iv) reading from each tag the annotation data.

39. A method as claimed in claim 38, wherein, in each memory tag provided with the master code, the step of comparing the received master code with a valid master code stored in the memory tag is carried out, and if the codes match, the annotation is output.

* * * * *